United States Patent
Boecker et al.

(10) Patent No.: US 9,242,549 B2
(45) Date of Patent: Jan. 26, 2016

(54) METHOD OF BLOW MOLDING RESERVOIR, AND RESERVOIR MADE THEREBY

(71) Applicant: TI Automotive Technology Center GmbH, Rastatt (DE)

(72) Inventors: Albert J. Boecker, Ettlingen (DE); Andreas W. Dobmaier, Karlsruhe (DE); Alex Ehler, Rastatt (DE); Patrick Gmuend, Karlsruhe (DE); Peter Grauer, Steinweiler (DE); Gerrit A. Michaelis, Friesenheim (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 222 days.

(21) Appl. No.: 13/793,482

(22) Filed: Mar. 11, 2013

(65) Prior Publication Data

US 2014/0252005 A1    Sep. 11, 2014

(51) Int. Cl.
| | |
|---|---|
| B60K 15/03 | (2006.01) |
| B29C 49/20 | (2006.01) |
| B29C 49/48 | (2006.01) |
| B29L 31/00 | (2006.01) |
| B29C 49/42 | (2006.01) |

(52) U.S. Cl.
CPC .......... B60K 15/03006 (2013.01); B29C 49/20 (2013.01); B29C 49/48 (2013.01); B60K 15/03177 (2013.01); *B29C 49/4273* (2013.01); *B29C 2049/2008* (2013.01); *B29C 2049/2047* (2013.01); *B29C 2049/4882* (2013.01); *B29L 2031/7172* (2013.01)

(58) Field of Classification Search
None
See application file for complete search history.

(56) References Cited

U.S. PATENT DOCUMENTS

| | | | |
|---|---|---|---|
| 4,877,147 A | 10/1989 | Hyde | |
| 5,103,865 A | 4/1992 | Hyde | |
| 5,221,021 A * | 6/1993 | Danna | 220/563 |
| 6,033,380 A * | 3/2000 | Butaric et al. | 604/103.07 |
| 6,527,892 B1 | 3/2003 | Gombert et al. | |
| 6,626,325 B1 | 9/2003 | Humphrey et al. | |
| 7,867,420 B2 | 1/2011 | Wolter | |
| 2008/0078761 A1 | 4/2008 | Borchert et al. | |
| 2011/0068515 A1 | 3/2011 | Jannot et al. | |
| 2011/0131771 A1 | 6/2011 | Jannot et al. | |
| 2012/0139168 A1 | 6/2012 | Sun et al. | |

FOREIGN PATENT DOCUMENTS

| | | |
|---|---|---|
| JP | H08192457 | 7/1996 |
| WO | WO2010081853 A1 | 7/2010 |
| WO | WO2012013276 A1 | 2/2012 |

OTHER PUBLICATIONS

Extended European Search Report for EP Application No. 14157536.5 dated Jul. 4, 2014 (6 pages).

* cited by examiner

*Primary Examiner* — Monica Huson
(74) *Attorney, Agent, or Firm* — Brinks Gilson & Lione

(57) ABSTRACT

A method of blow molding a reservoir, such as an automotive fuel tank, may include one or more steps. In one step, the reservoir is at least partially formed to have a first wall and a second wall. The first wall defines a first interior and the second wall defines a second interior that may be open to the first interior. In another step, the second wall is contracted inwardly before its material hardens. After contraction, the volume of the second interior is reduced. The contraction may be performed via a mold tool assembly having one or more moveable tool segments.

17 Claims, 5 Drawing Sheets

METHOD OF BLOW MOLDING RESERVOIR, AND RESERVOIR MADE THEREBY

TECHNICAL FIELD

The present disclosure relates generally to reservoirs, and more particularly to methods and equipment used to form reservoirs.

BACKGROUND

Reservoirs are commonly used to hold a liquid and are typically made by a blow molding process. For example, automotive fuel tanks hold fuel and are usually blow molded. In the automotive example, fuel lines are sometimes connected to fuel tanks for incoming and outgoing fuel, vapor lines are sometimes connected to fuel tanks for delivering vapor to a downstream charcoal canister, and other components can be connected to fuel tanks. The connections between fuel tanks, lines, and components often include connection components and welds. In particular, the connections sometimes involve cutting a hole in the reservoir, and welding or otherwise sealing a connection component around the periphery of the hole. While these connections may be effective, in some cases the connection components, welding, and cutting can add cost and complexity to the assembly, and may be vulnerable to leakage in the fuel tank.

SUMMARY

A method of blow molding a reservoir may include a couple of steps. One step may include forming the reservoir. The reservoir may have a first wall defining a first interior and may have a second wall that extends from the first wall and defines a second interior. The first and second interiors may be open to each other. The second interior may have a volume. Another step may include contracting the second wall inwardly before the material of the second wall hardens. This may reduce the size of the volume. The contraction may be performed via a mold tool assembly having one or more moveable tool segments A method of blow molding a portion of a reservoir may include a couple of steps. One step may include providing a mold tool assembly defining a mold cavity having a first perimeter length in a first position and a second perimeter length in a second position. The second perimeter length may be less than the first perimeter length. Another step may include disposing a portion of the material from which the reservoir is formed into the mold cavity in the first position. Yet another step may include bringing the mold tool assembly to the second position to compress the portion of the material in the mold cavity and thereby change the shape of the portion to a desired final shape.

A molded reservoir may include a first wall, a second wall, and a fitting. The first wall may define a first interior. The second wall may extend from the first wall and may itself define a second interior that may be open to the first interior. The fitting may be embedded into a material of the second wall at an inner surface of the second wall. The fitting may have a first portion that may be accessible to the first interior, and may have a second portion that may be located partially or more in the second interior.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Referring in more detail to the drawings, methods of blow molding a reservoir are detailed in this description, and in particular methods of preparing the reservoir for making connections with fluid lines, fluid fittings, and other components. The connections made may ultimately provide an effective seal against fluid leakage at the reservoir and, in some embodiments, may do so without the cost and relative complexity of the previously-known connection components and accompanying steps. The methods are especially suitable for making a reservoir like an automotive fuel tank 10, and indeed this description is provided in the context of an automobile. But the reservoir and accompanying methods could be suitable in other applications such as marine applications.

Figure 1:
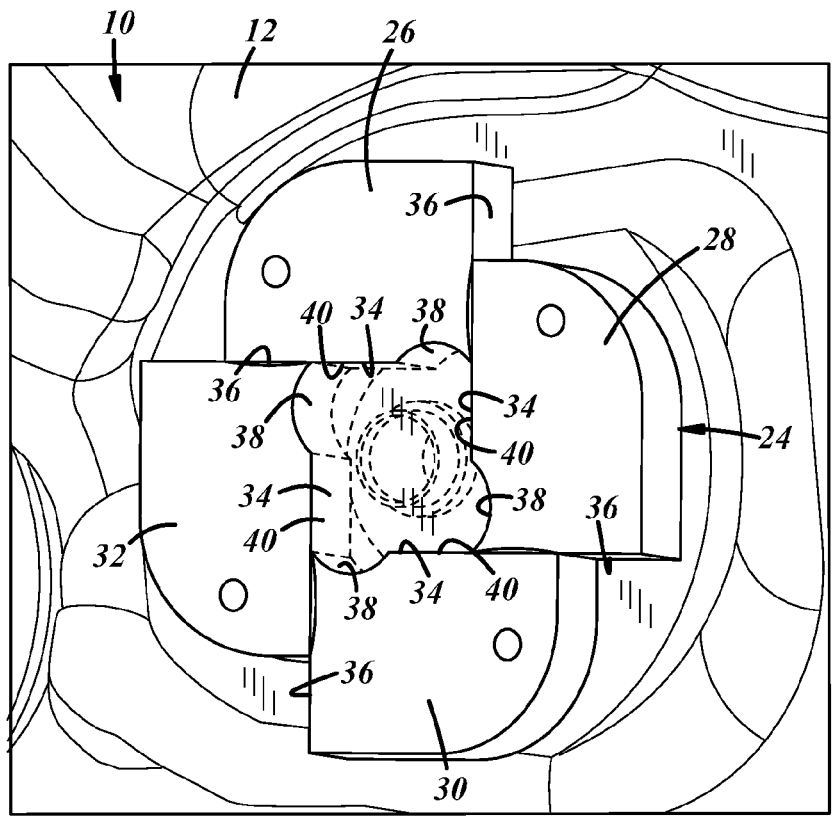
FIG. 1 is a fragmentary perspective view of a portion of an example reservoir and an embodiment of a mold tool assembly shown in an expanded position.

Referring to FIG. 1, a portion of the automotive fuel tank 10 is shown and can be equipped in a larger automotive fuel system that also includes a gasoline or diesel engine. The fuel tank 10 has a wall 12 that defines an interior 13 (FIG. 4) for holding and containing fuel to be consumed in the fuel system. The wall 12 can be composed of a multi-layer plastic material such as a high density polyethylene (HDPE) layer, an ethylene vinyl alcohol (EVOH) layer, adhesive layers, or other and different layers, or can be composed of a single layer material. The fuel tank 10 can be formed during a blow molding process in which molding dies define a cavity matching the outer shape of the fuel tank, and in which pressurized gas expands a molten plastic parison against the cavity. The molten parison is allowed to harden and set to form the finally-shaped fuel tank 10.

In this embodiment, a fuel tank nipple 14 (FIGS. 3 and 5-8) is provided as part of the fuel tank 10 and serves as a member used to couple the fuel tank to a fluid line, to a fluid fitting, or to other components. For example, the nipple 14 can serve as a member—and in this particular example can serve as the fuel tank neck tubing—in the vehicle fuel tank connection assembly disclosed in U.S. patent application Ser. No. 13/650,745 entitled "Fuel Tank Connection Assembly" and assigned to TI Automotive Technology Center GmbH. Once formed, the nipple 14 can have different designs and constructions depending upon, among other factors, the design and construction of the fluid line, fitting, or component with which it is ultimately coupled. In the embodiment of FIGS. 5-8, for example, the nipple 14 has a wall 16 that depends or extends from the wall 12 of the larger portion of the fuel tank 10 and is a unitary extension of the wall 12. Here, the nipple 14 is hollow and defines an interior 18, but one that is much smaller than the interior 13 used for holding and containing fuel. The interiors defined by the walls 12, 16 are open to each other and communicate with each other. When finally formed, the nipple 14 in this embodiment has an open end 19 spaced from the fuel tank wall 12, and on an inwardly-facing side has an inner surface 20 and on an outwardly-facing side has an outer surface 22.

The nipple 14 can be made in a number of ways and with a number of mold tool assemblies. The nipple 14 and its wall 16 come from the previously-mentioned parison that forms the finally-shaped fuel tank 10. In the embodiment of the figures, for instance, its formation process involves steadily decreasing the size and shape of the wall 16 while the wall is still partially molten and ductile, as one step in the fuel tank's blow molding process. In other words, in this embodiment the interior 18 goes from having a first volume when the nipple 14 is in an unfinished state, and is gradually reduced to a second volume in a finished state that has a value less than the first volume. The wall 16 also goes from a first size to a smaller second size from the unfinished state to the finished state.

Referring now to FIG. 1, in this embodiment the formation process is accomplished via a mold tool assembly 24. The mold tool assembly 24 can have different designs, constructions, and components, depending upon the design and construction of the nipple 14, among other factors. In the larger fuel tank blow molding process, the mold tool assembly 24 can be located and arranged adjacent the molding dies used to ultimately form the interior 13 of the fuel tank 10. In FIG. 1, the mold tool assembly 24 includes four tool segments or sliders that work together to steadily decrease the size and shape of the nipple 14—a first tool segment 26, a second tool segment 28, a third tool segment 30, and a fourth tool segment 32. In other embodiments, more or less than four tool segments could be provided for the mold tool assembly; for instance, another embodiment of the mold tool assembly shown in FIGS. 9-11 and subsequently described includes six tool segments, and still the mold tool assembly could include other numbers of tool segments. Referring back to the embodiment of FIG. 1, each tool segment has a first working surface 34 that engages and makes contact with the wall 16, and a second working surface 36 that makes sliding contact with the first working surface of an adjacent and neighboring tool segment. The first working surface 34 of each tool segment may be made up of an arcuate section 38 and a non-arcuate and generally planar section 40. In this embodiment, the section 38 is provided with an arcuate profile since the nipple 14 has a finished cylindrical shape, while the section 40 is provided with a generally planar profile since it slides against a complementary generally planar surface when the mold tool assembly 24 is in use; other profiles are possible for these sections depending on the nipple's finished shape and the sliding movement.

With the tool segments working together, the mold tool assembly 24 begins at a fully retracted and open state or position as shown in FIG. 1. In this state the first working surfaces 34 of the tool segments 26, 28, 30, 32 define a first mold tool cavity that produces the first volume of the interior 18. Both the arcuate and planar sections 38, 40 help define the first mold tool cavity. From the open state, the mold tool assembly 24 is generally contracted or advanced inwardly as the individual tool segments 26, 28, 30, 32 are continuously moved closer toward one another and toward a centroid of the interior 18.

Figure 2:
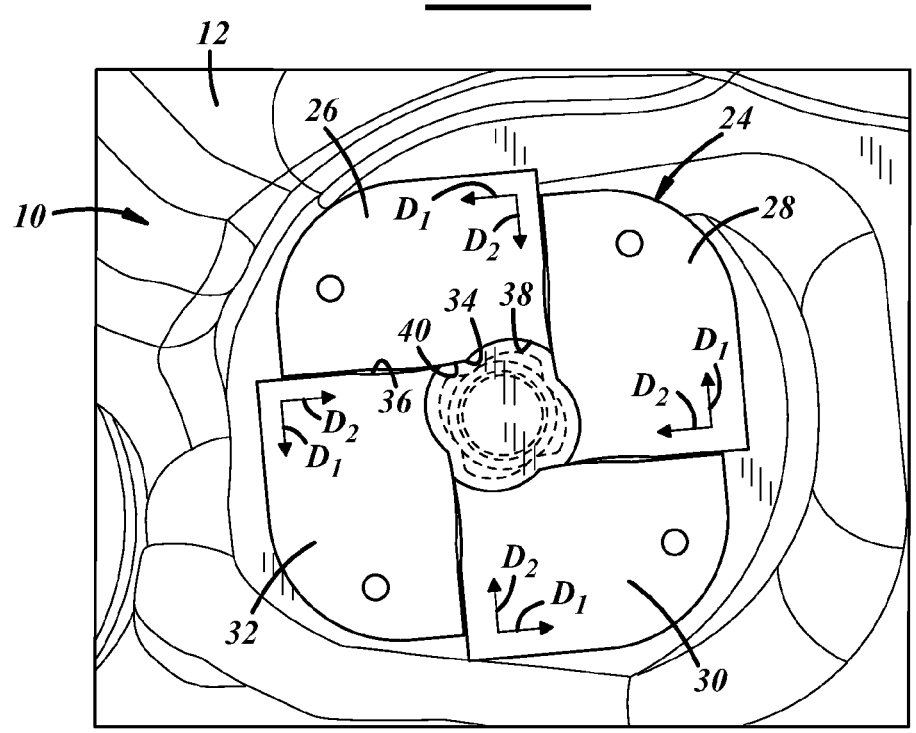
FIG. 2 is a fragmentary perspective view similar to FIG. 1, but with the mold tool assembly shown between its expanded and contracted position.

FIG. 2 shows the mold tool assembly 24 in the midst of its contraction and movement to an advanced and closed state or position. Each of the tool segments 26, 28, 30, 32 concurrently move in the directions $D_1$ and $D_2$ as the tool segments are advanced and increasingly overlapped with one another and the mold tool cavity reduces in size and the respective working surfaces 34, 36 slide against each other. Taking the first and fourth tool segments 26, 32 as an example for illustrative purposes, the first working surface 34—and specifically the planar section 40 of the first tool segment—directly confronts and makes surface-to-surface sliding contact with the second working surface 36 of the fourth tool segment as movement progresses.

Figure 3:
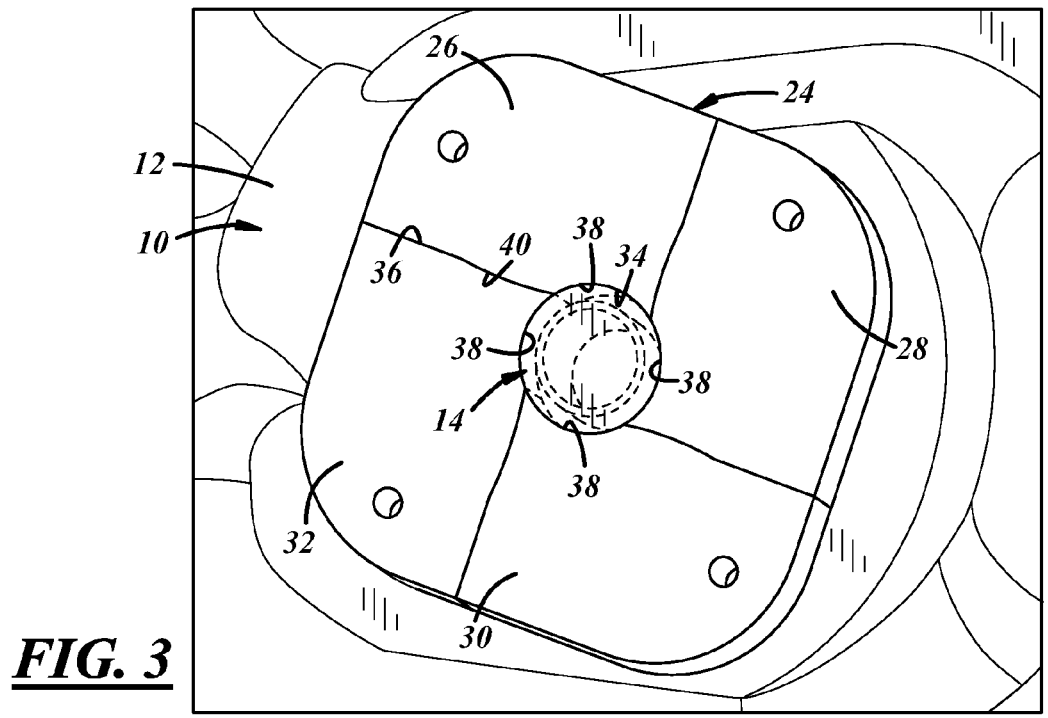
FIG. 3 is a perspective view similar to FIG. 1, but with the mold tool assembly fully contracted.

FIG. 3 shows the mold tool assembly 24 in a fully advanced and closed state. Here, all of the arcuate sections 38 of the tool segments, which were initially unaligned, come together and are now circumferentially aligned with one another to define a second mold tool cavity that produces the second volume of the interior 18. In this embodiment, a resulting generally cylindrical shape is defined by the arcuate section 38 when the tool segments are in their fully advanced position. The planar sections 40, on the other hand, no longer define the mold tool cavity and no longer engage the wall 16. Instead, the planar sections 40 solely make surface-to-surface contact with the respective second working surfaces 36.

From the open to closed state of the mold tool assembly 24, the material of the wall 16 is continually deformed and displaced inwardly as the first working surfaces 34 generally maintain engagement and contact with the outer surface 22. The material of the wall 16 may amass and thicken somewhat as the interior's volume is reduced and the wall is shaped to a cylinder. Also from the open to closed state, the size of the nipple 14 may be reduced by approximately one-half. For example, when the mold tool assembly 24 is at its open state, the nipple 14 can have a greatest cross-wise extent of approximately 40 mm; and when the mold tool assembly is subsequently at its closed state, the nipple can have a resulting diameter of approximately 20 mm. Of course, other size reductions are possible including those that are greater than or less than one-half.

Figure 4:
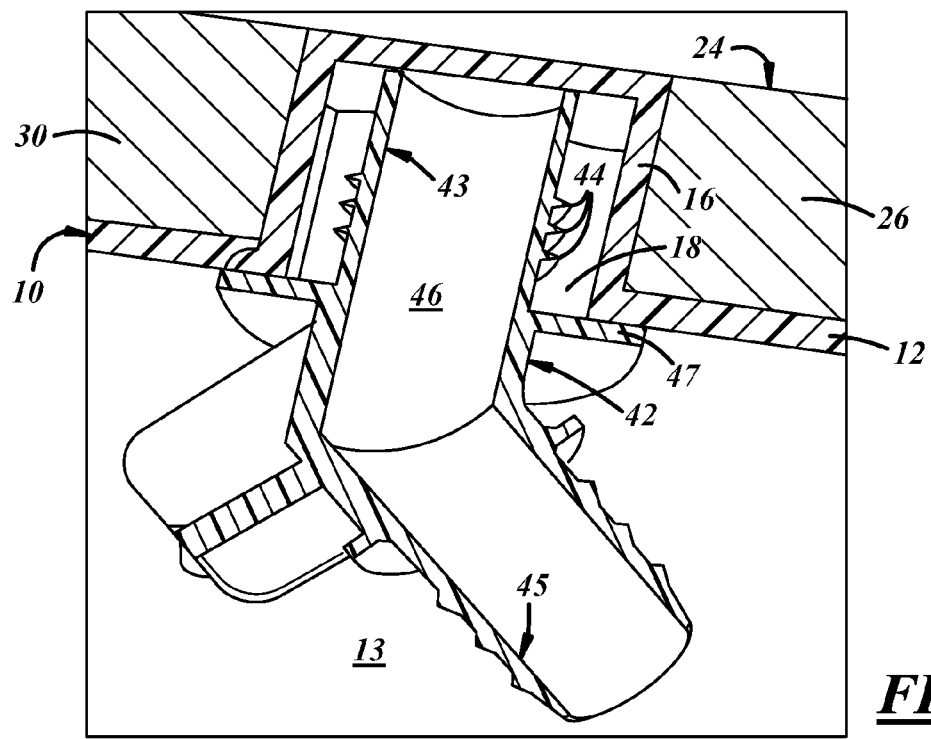
FIG. 4 is a sectional view of a portion of the reservoir and mold tool assembly of FIG. 1, and also showing an example of a fitting within the reservoir.
Figure 5:
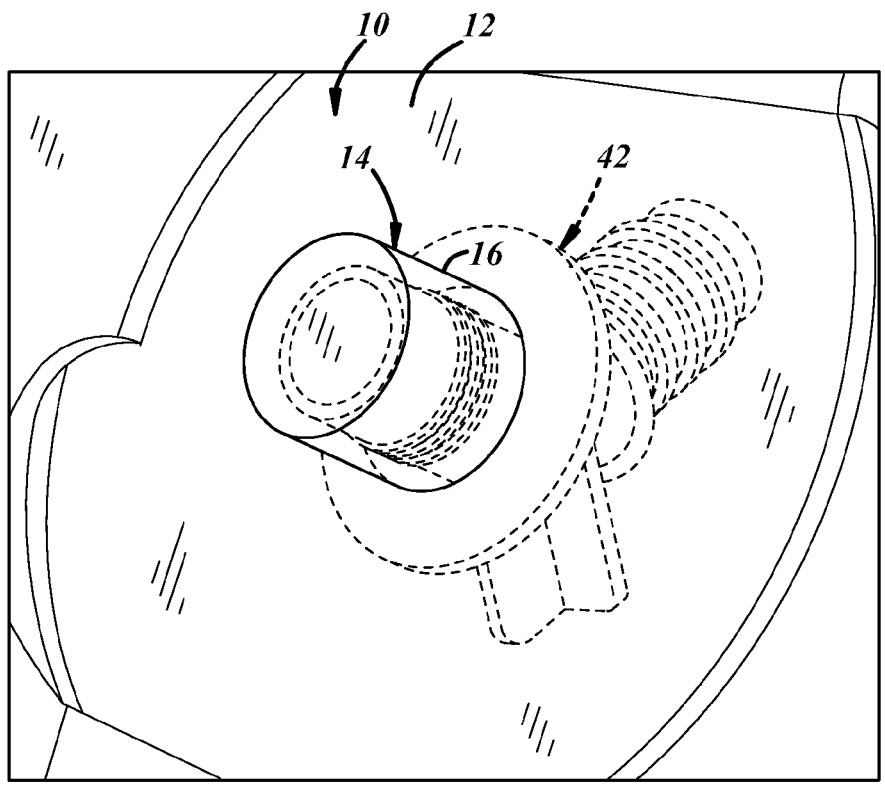
FIG. 5 is a perspective view of a portion of the exterior of the reservoir with the mold tool assembly removed and the fitting shown in hidden lines.
Figure 6:
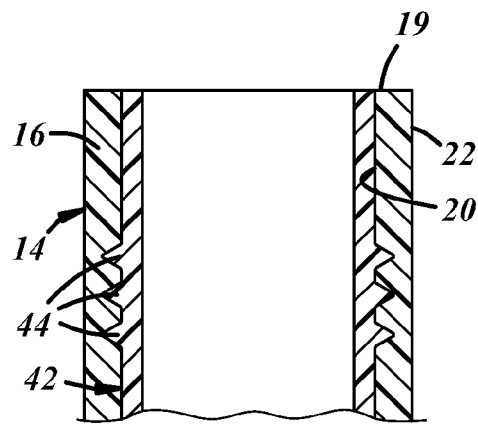
FIG. 6 is a sectional view of a portion of an example reservoir wall and fitting wall.

Referring now to FIGS. 4-6, in one embodiment a fitting 42 is inserted into the interior 18 of the nipple 14 before the mold tool assembly 24 reaches its closed state. The fitting 42 may take different forms including a vent tubing, as shown in the figures, that ultimately attaches to interior and exterior vapor lines. Depending on its form, the vent tubing 42 can be composed of a plastic material such as an HDPE or polyamide (PA) material. As shown best in FIG. 4, a first portion 43 of the vent tubing 42 that eventually communicates with an exterior vapor line is located in the interior 18, while a second portion 45 that eventually attaches to an interior vapor line is located in or accessible from the interior 13 of the fuel tank 10 where it remains suspended for the attachment. Both first and second portions have a generally cylindrical shape. On its outside, the vent tubing 42 has a set of ribs 44 that gets embedded into the material of the partially molten wall 16 at the inner surface 20 when the mold tool assembly 24 is closed, and on its inside, the vent tubing has a passage 46 for vapor flow out of the fuel tank 10. The vent tubing 42 shown here has a radially-extending flange 47 to assist proper positioning of the vent tubing with respect to the fuel tank wall 12.

The insertion of the vent tubing 42 into the interior 18 can take place at different times during the formation process of the hollow nipple 14. In one embodiment, for instance, the insertion could occur before the mold tool assembly 24 begins its contraction and during the fuel tank's blow molding process which may involve separating severed halves of the parison used to form the fuel tank 10 and placing the vent tubing 42 inside of the interior 18. The severed halves of the parison are then brought back and rejoined together to form a complete and continuous parison. Once the vent tubing 42 is inserted in the interior 18, the mold tool assembly 24 is brought to its closed state and the inner surface 20 of the wall 16 engages the first portion 43 of the vent tubing located in the interior and may completely surround and engage the periphery of the first portion. The molten material of the wall 16 is then allowed to harden and set, which could be accomplished simply by leaving it at rest for a duration of time sufficient for material solidification. As shown best by FIG. 6, the material of the wall 16 encases the first portion 43 of the vent tubing 42 and surrounds the ribs 44 and fills in the spaces between the ribs. In this way, the ribs 44 help ensure that an embedded and secure joint is established between the wall 16 and the vent tubing 42. Furthermore, depending on the material compositions of the wall 16 and the vent tubing 42, a chemical bond and coherence may develop between the two upon hardening.

Figure 7:
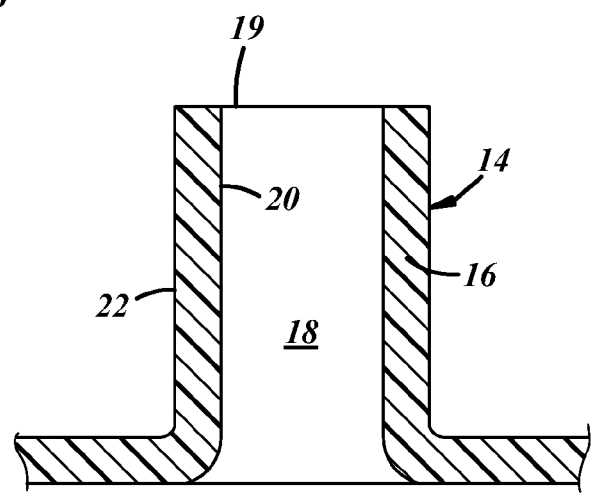
FIG. 7 is a sectional view of a portion of an example reservoir wall.

After hardening or even before, a closed end of the wall 16 and an end of the vent tubing 42 can be severed and cut to provide the open end 19. In this embodiment, the nipple 14 can now serve as a member in a vehicle fuel tank connection assembly like the one disclosed in U.S. patent application Ser. No. 13/650,745. Of course, other vehicle fuel tank connection assemblies are contemplated, including the connection of a mere rubber hose via a friction fit, clamping, heat staking, or another technique. In an embodiment in which a fitting is not inserted into the interior 18, the wall 16 is hardened alone as shown in FIG. 7, and the hollow nipple 14 may still serve as a member in a vehicle fuel tank connection assembly. Still, in another embodiment, the mold tool assembly 24 could form ribs or other features on the inner surface 20, outer surface 22, or both, in order to facilitate subsequent connection of a tube, hose, or other component.

Figure 8:
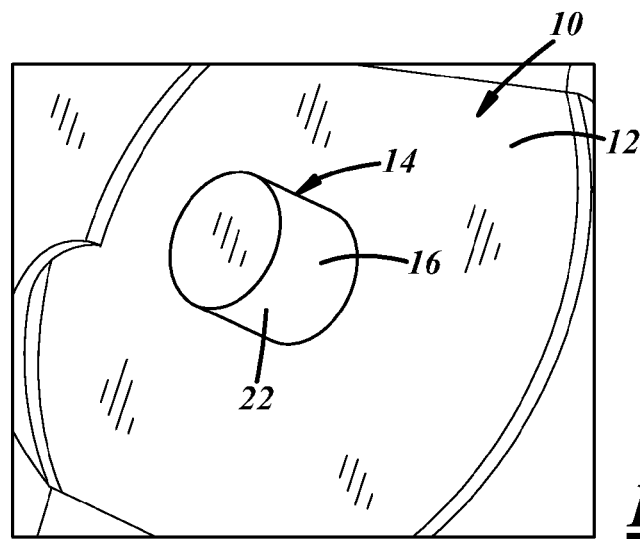
FIG. 8 is a perspective view of a portion of an example reservoir wall.

Referring now to FIG. 8, in another embodiment a fitting is not inserted and the wall 16 is hardened to a solid and fully-filled state after the mold tool assembly 24 is brought to its closed state. In this embodiment the nipple 14 is solid and is not hollow with an interior like the previous embodiment; the nipple could also be mostly but not completely solid. During its formation, the material of the wall 16 amasses together and completely or mostly fills in any interior space. The complete filling may be accomplished, for example, by contracting the tool segments closer together in the closed state as compared to the embodiment of the hollow nipple or by providing a greater amount of material in the mold tool cavity that would not provide a hollow interior when the tool segments are in the closed state. The solid nipple 14 of FIG. 8 is suitable to assist the connection of components at the exterior of the fuel tank 10, including a charcoal canister, exterior fluid lines, or a heat shield, or perhaps to assist mounting the fuel tank in an automobile such as via a strap or other connector.

Figure 9:
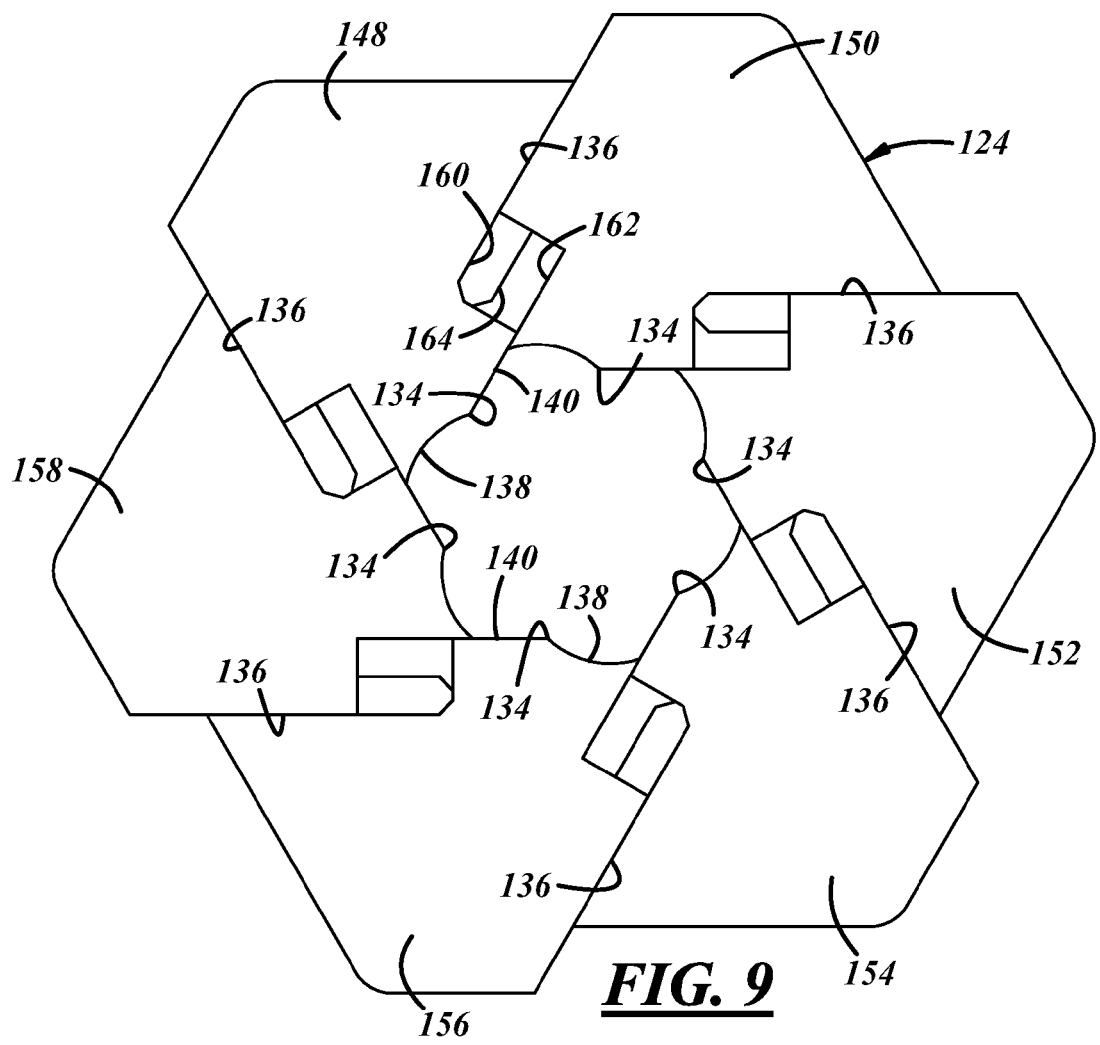
FIG. 9 is a plan view of another embodiment of a mold tool assembly shown in an expanded position.
Figure 10:
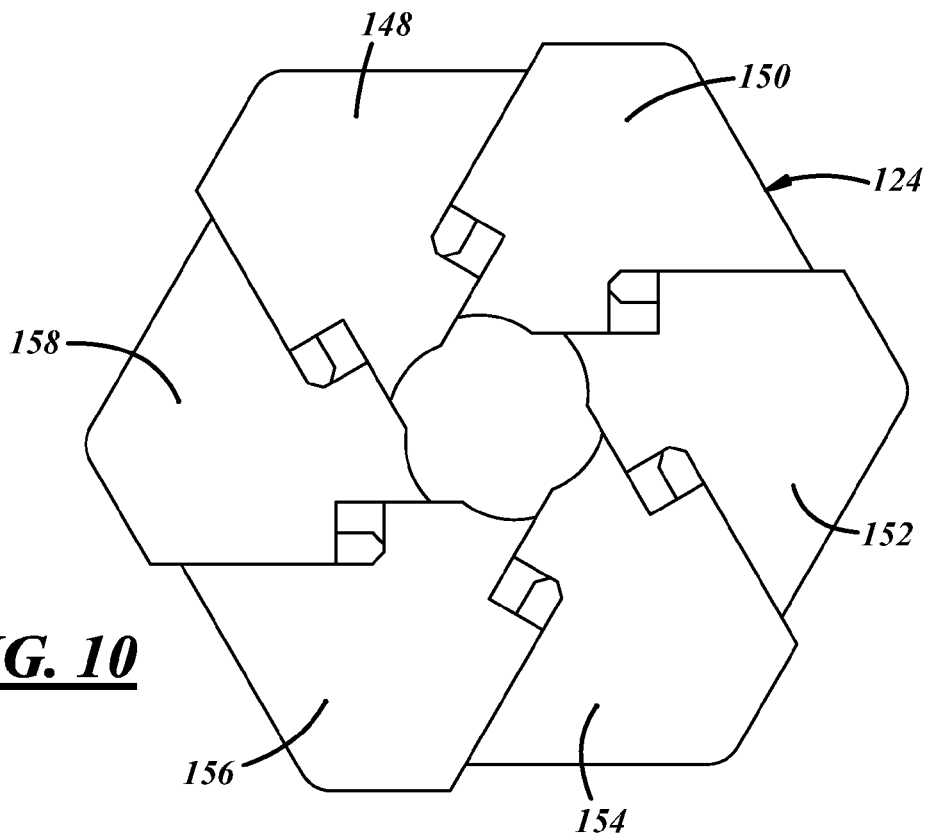
FIG. 10 is a plan view similar to FIG. 9, but with the mold tool assembly in the midst of contracting.
Figure 11:
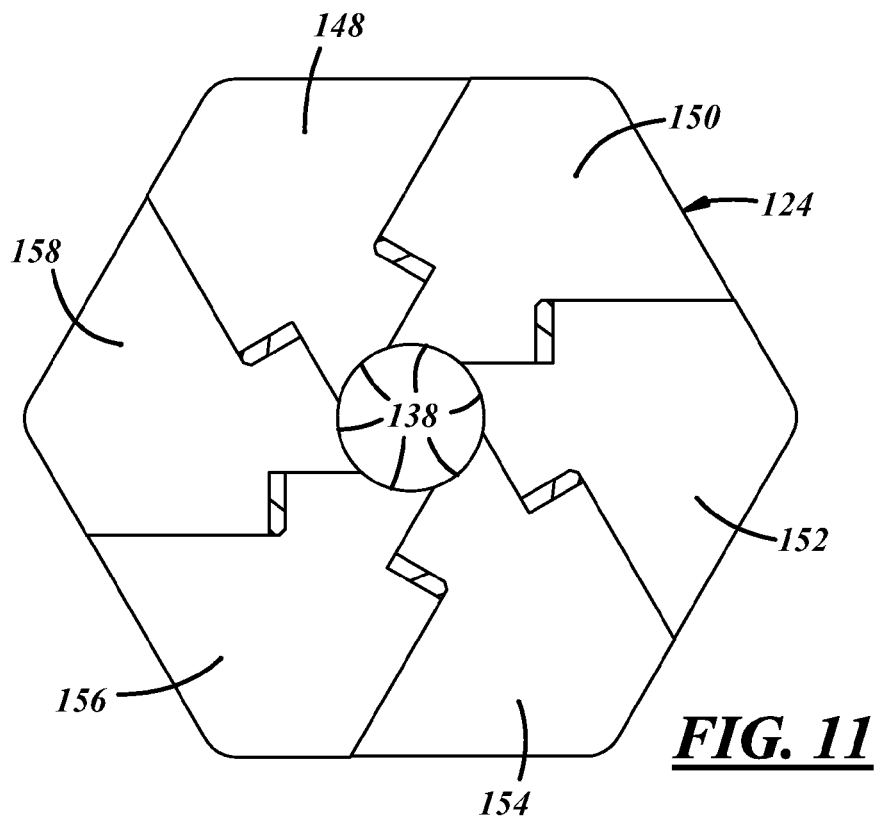
FIG. 11 is a plan view similar to FIG. 9, but with the mold tool assembly fully contracted.

FIGS. 9-11 show another embodiment of a mold tool assembly 124. This time, the mold tool assembly 124 includes six tool segments or sliders that work together to steadily decrease the size and shape of a hollow or solid nipple—a first tool segment 148, a second tool segment 150, a third tool segment 152, a fourth tool segment 154, a fifth tool segment 156, and a sixth tool segment 158. As before, each tool segment has a first working surface 134 that engages and makes contact with a wall of the nipple, and has a second working surface 136 that makes sliding contact with the first working surface of an adjacent and neighboring tool segment. The first working surface 134 of each tool segment is made up of an arcuate section 138 and a non-arcuate and generally planar section 140. But in this embodiment, unlike the previous embodiment, each of the first and second working surfaces 134, 136 has a complementary stepped construction that facilitate interconnected guided movement of the segments during the formation process. Taking the first and second tool segments 148, 150 as an example for illustrative purposes, the first working surface 134 has a first step 160 shaped along its extent, and the second working surface 134 has a complementarily-sized-and-shaped second step 162. Between the steps 160, 162, a guide 164 pilots and facilitates movement among the tool segments; other ways could be employed to guide and facilitate movement among the tool segments.

FIGS. 9-11 show the mold tool assembly's successive movement from its fully retracted and open state in FIG. 9, to its intermediately retracted state in FIG. 10, and lastly to its fully advanced and closed state in FIG. 11. As before, the tool segments 148, 150, 152, 154, 156, and 158 concurrently move inwardly and become increasingly overlapped. Also, all of the arcuate sections 138 come together and align with one another in the closed state, although this is not necessary.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method of blow molding a fuel tank, the method comprising:
    forming the fuel tank of a molten plastic material, the fuel tank having a first wall defining a first interior adapted to receive a liquid and having a second wall extending from said first wall and defining a second interior, said first and second interiors open to each other, said second interior having a volume;
    contracting said second wall inwardly before the material of said second wall hardens to reduce the size of said volume;
    the step of contracting said second wall further comprises bringing said second interior to a second volume which is less than said first volume;
    inserting a fitting at least partially inside of said second interior;
    contracting said second wall inwardly to said second volume, wherein said second wall engages at least a part of said fitting; and
    allowing the material of said second wall to harden over said fitting to thereby join said second wall and said fitting together.

2. The method of claim 1, wherein the step of contracting said second wall further comprises reducing the size of said volume to zero in which said second wall fills said second interior.

3. The method of claim 1, wherein the step of forming the fuel tank further comprises forming said second wall via a mold tool assembly that defines a first mold cavity in which said second wall is received, and that contracts to define a second mold cavity for reducing the size of said volume.

4. The method of claim 3, wherein the step of contracting said second wall further comprises bringing a plurality of tool segments of said mold tool assembly toward one another as surfaces of said tool segments engage portions of said second wall when reducing the size of said volume.

5. The method of claim 3, wherein the step of contracting said second wall further comprises bringing a plurality of tool segments of said mold tool assembly together, wherein each of said tool segments engages a portion of said second wall when reducing the size of said volume, and each of said tool segments slides against two other adjacent tool segments when all of said tool segments are brought together.

6. The method of claim 3, wherein the step of contracting said second wall further comprises bringing a plurality of tool segments of said mold tool assembly together, and wherein each tool segment has an arcuate surface, and said arcuate surfaces align with one another and form a generally cylindrically-shaped mold cavity in a closed state of said mold tool assembly.

7. The method of claim 1, wherein said second interior has a non-cylindrical shape when it has said first volume, and has a cylindrical shape when it has said second volume.

8. The method of claim 1, further comprising:
providing a mold tool assembly defining a mold cavity having a first perimeter length in a first position and a second perimeter length in a second position where said second perimeter length is less than said first perimeter length;
disposing at least a portion of the second wall into said mold cavity in said first position; and
bringing said mold tool assembly to said second position to compress at least a portion of the material of the second wall in said mold cavity and change the shape of said portion of the second wall to a desired final shape.

9. The method of claim 8, further comprising engaging at least a portion of the material of the second wall with said mold tool assembly when said mold tool assembly is brought to said second position.

10. The method of claim 8, further comprising inserting a fitting into at least a portion of the second wall received in said mold cavity before said mold tool assembly is brought to said second position, and subsequently bringing said mold tool assembly to said second position wherein a portion of the material of the second wall encloses over said fitting.

11. The method of claim 8, further comprising severing a portion of the material of the second wall to expose an interior of said second wall to an exterior outside of the fuel tank.

12. The method of claim 8, wherein the step of bringing said mold tool assembly to said second position further comprises contracting a plurality of tool segments of said mold tool assembly toward one another.

13. The method of claim 12, wherein, amid contraction to said second position, surfaces of said plurality of tool segments slide against each other.

14. The method of claim 12, wherein each of said plurality of tool segments has an arcuate surface that makes contact with a section of at least a portion of the second wall of said portion of the material when said mold tool assembly is brought from said first position to said second position.

15. The method of claim 14, wherein said arcuate surfaces are unaligned with one another when said mold tool assembly is in said first position and provide said mold cavity with a non-cylindrical shape, and said arcuate surfaces are aligned with one another when said mold tool assembly is in said second position and provide said mold cavity with a generally cylindrical shape.

16. The method of claim 1, wherein the step of contracting said second wall further comprises bringing a plurality of tool segments of a mold tool assembly toward one another so that the tool segments engage portions of said second wall when reducing the size of said volume, and wherein each tool segment includes a first working surface that engages the second wall, and a second working surface that makes sliding contact with the first working surface of an adjacent and neighboring tool segment when the tool segments are brought toward one another during the step of contracting said second wall.

17. A method of blow molding a fuel tank, the method comprising:
forming the fuel tank of a molten plastic material, the fuel tank having a first wall defining a first interior adapted to receive a liquid and having a second wall extending from said first wall and defining a second interior, said first and second interiors open to each other, said second interior having a volume;
contracting said second wall inwardly before the material of said second wall hardens to reduce the size of said volume; and
severing a portion of said second wall to expose said second interior to an exterior outside of the fuel tank.

* * * * *